May 31, 1938.                H. HANSEN                2,118,923
ROLLING PIN SCRAPER
Filed Aug. 21, 1936
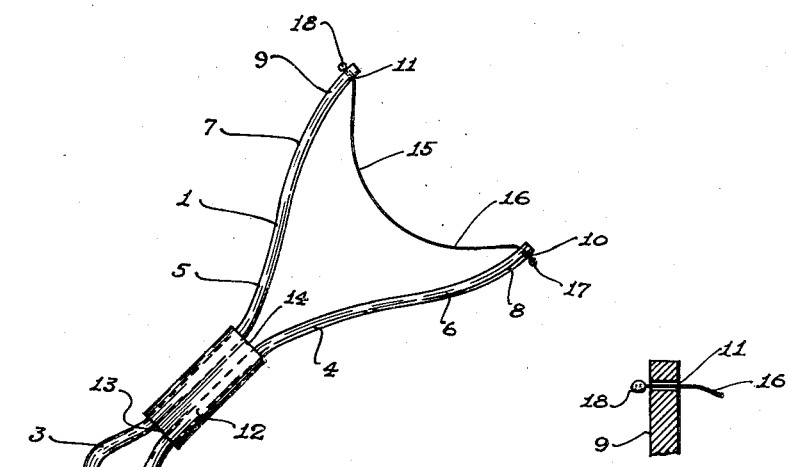
Fig. 1
Fig. 2
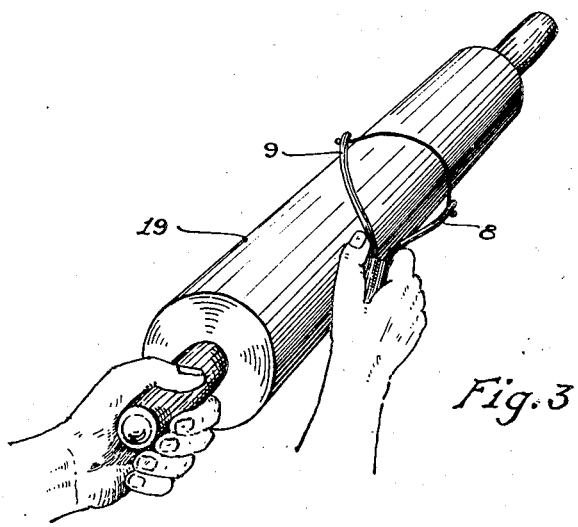
Fig. 3
ATTEST —
Herbert E Birch
Wm C. Meiser
Henry Hansen
INVENTOR
BY
ATTORNEY Patented May 31, 1938

2,118,923

UNITED STATES PATENT OFFICE 2,118,923

ROLLING PIN SCRAPER

Henry Hansen, Burlingame, Calif., assignor to Swift and Company, Chicago, Ill., a corporation of Illinois Application August 21, 1936, Serial No. 97,159

1 Claim. (Cl. 15—236)

This invention relates to a cleaning implement and particularly to an implement for cleaning the outer surfaces of cylinders.

One of the objects of the invention is to provide a cleaning implement having a pliable scraping element adapted for readily adjusting itself to the peripheral surface of a cylinder.

Another object of the invention is to provide an implement for removing particles of dough and the like from the outer surface of a rolling pin.

Other objects of the invention will be apparent from the description and the claim which follows.

By way of illustration and not by way of limitation, the device of the present invention will be described as being applicable for removing particles of dough and the like from the surfaces of rolling pins. It will be understood, however, that the device is equally applicable for cleaning the surfaces of cylinders used for other purposes.

The device of the present invention comprises a handle provided with two diverging prongs forming a fork having a scraping element, such as slack wire, attached at either of its ends to the ends of the prongs. In use, the prongs forming the fork are placed in a straddling position over the cylinder until the scraping element is drawn taut against a sector of the cylinder surface. The implement is then drawn longitudinally of the cylinder surface whence the sector covered by the scraping element is thoroughly cleaned. The cylinder is then given a slight turn and the operation repeated until the entire surface thereof has been covered with the scraping element.

In the drawing, similar characters of reference are used to designate similar elements.

Figure 1 is a plan view illustrating one embodiment of the device constructed in accordance with the present invention.

Figure 2 is an enlarged fragmentary sectional view showing one means of attaching the ends of the scraping element to the ends of the prongs.

Figure 3 is a perspective view showing the implement being applied to the surface of a rolling pin.

In the drawing, the implement is shown constructed of a single strand of relatively rigid wire 1, looped as at 2 to form handle 3. The ends of the strand 1 are bent outwardly, as at 4 and 5, and inwardly, as at 6 and 7, to form diverging prongs 8 and 9, provided at the ends thereof with openings 10 and 11.

Band 12, of relatively soft metal or other suitable material, is formed around handle portion 3 and is secured, as by clenching the ends thereof, between the looped strand, as at 13 and 14. Band 12 serves to rigidly retain prongs 8 and 9 in relative position.

Scraping element 15 comprises a slack strand of pliable wire 16, the ends of which are passed through openings 10 and 11 and secured by upset portions 17 and 18. As shown in Figure 2, portions 17 and 18 may comprise balls of solder or the like secured at the ends of wire 15.

It will be seen that by use of a pliable wire the scraping element 15 will readily adjust itself to the surfaces of rollers within a reasonable range of diameters.

As shown in Figure 3, the implement may be applied with one hand while the rolling pin 19, or other cylinder, is being held with the other. Prongs 8 and 9 are made to straddle the rolling pin so that scraping element 15 is drawn taut against the straddled sector of the rolling pin. The implement is then drawn longitudinally of the rolling pin surface whence the sector covered by the scraping element will be thoroughly cleaned. The rolling pin is then given a slight turn and the operation repeated until the entire surface of the rolling pin has been scraped.

I claim:

In a cleaning implement including a handle provided with two outwardly diverging prongs forming a fork, a scraping element comprising a slack, pliable wire secured at each of its ends to the ends of the prongs, the scraping element being adapted to readily conform to a convexly curved surface.

HENRY HANSEN.